W. J. FRANCKE.
UNIFORM MOTION UNIVERSAL JOINT.
APPLICATION FILED NOV. 30, 1920.

1,392,754.

Patented Oct. 4, 1921.

WITNESSES
H. T. Walker

INVENTOR
WILLIAM J. FRANCKE
BY
ATTORNEYS

W. J. FRANCKE.
UNIFORM MOTION UNIVERSAL JOINT.
APPLICATION FILED NOV. 30, 1920.
1,392,754. Patented Oct. 4, 1921.
2 SHEETS—SHEET 2.
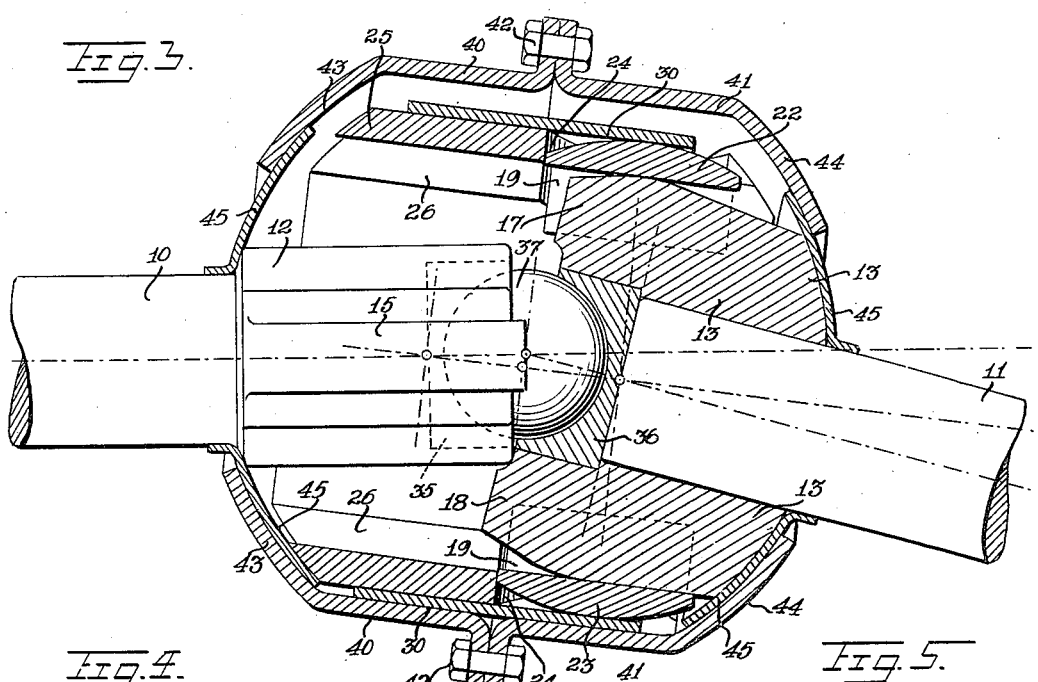
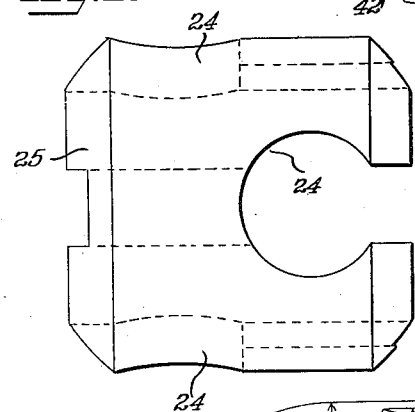
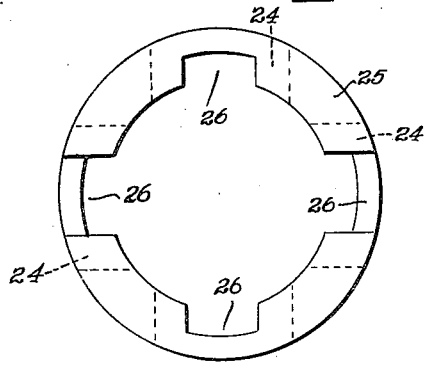
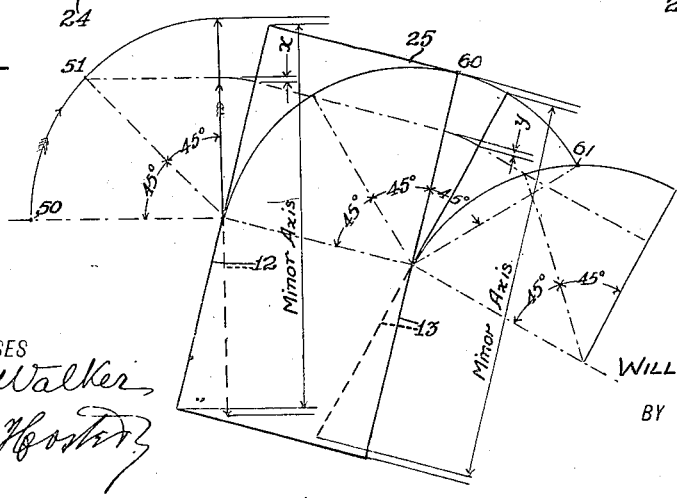
WITNESSES
H. J. Walker
Geo. G. Hoster
INVENTOR
WILLIAM J. FRANCKE
BY Munn & Co.
ATTORNEYS

UNITED STATES PATENT OFFICE.

WILLIAM J. FRANCKE, OF HIGHLAND PARK, NEW JERSEY, ASSIGNOR TO THE FRANCKE CO., OF NEW BRUNSWICK, NEW JERSEY, A CORPORATION OF NEW JERSEY.

UNIFORM-MOTION UNIVERSAL JOINT.

1,392,754. Specification of Letters Patent. Patented Oct. 4, 1921.

Application filed November 30, 1920. Serial No. 427,334.

*To all whom it may concern:*

Be it known that I, WILLIAM J. FRANCKE, a citizen of the United States, and a resident of Highland Park, in the county of Middlesex and State of New Jersey, have invented a new and improved Uniform-Motion Universal Joint, of which the following is a full, clear, and exact description.

The object of the invention is to provide a new and improved uniform motion universal joint arranged to insure a uniform transmission of power from the driving shaft to the driven shaft irrespective of the angular position of the shafts.

Another object is to positively drive one shaft from the other with the angular advance of the hubs or flanges uniform.

With these and other objects in view, the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Fig. 3 is a longitudinal central section of the uniform motion universal joint with the driving and driven shafts in angular position, one relative to the other;

Fig. 4 is a reduced plan view of the coupling sleeve;

Fig. 5 is a face view of the same; and

Fig. 6 is a diagrammatic view illustrating that the angular advance of the hubs or flanges is uniform.

When connecting two angularly disposed shafts by a ball and socket joint or other universal coupling as now generally constructed, one of the joint members travels in a non-circular path relative to the other joint member and an irregular angular advance takes place in one joint member relative to the other thus producing an irregular transmission of power and a loss of power. With the improved universal joint presently described in detail, the above-mentioned defects are overcome to insure the transmission of a continuous uniform motion from the driving shaft to the driven shaft.

Figure 1:
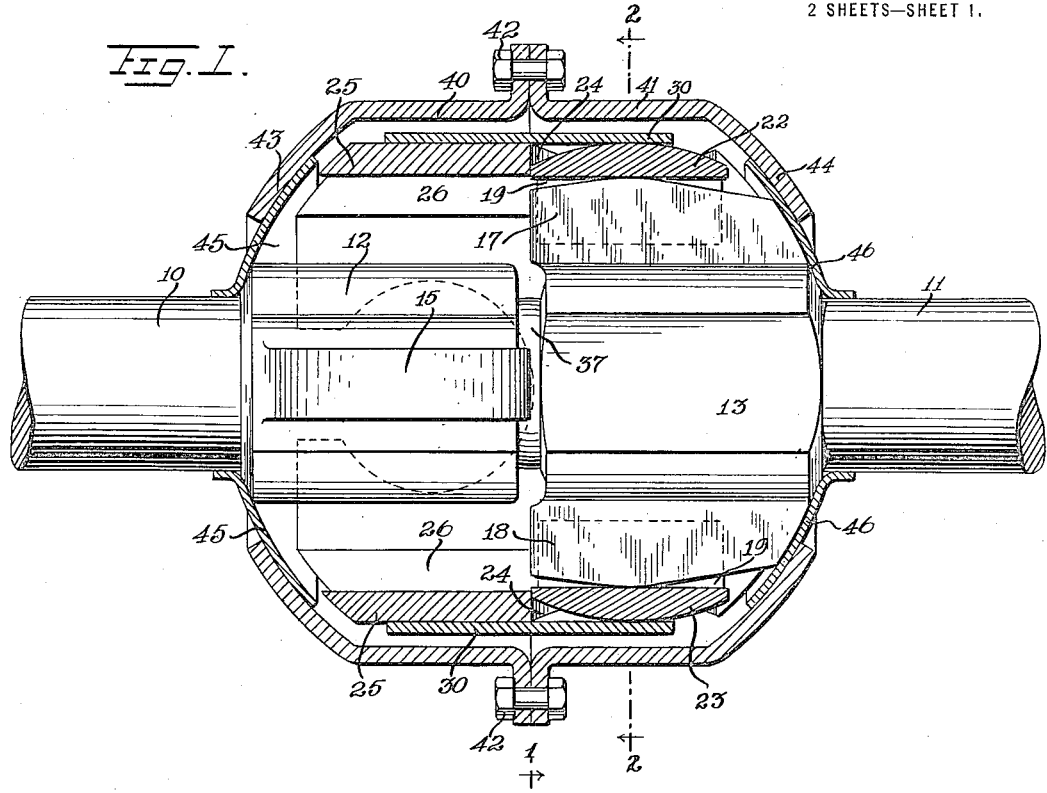
Figure 1 is a longitudinal central section of the uniform motion universal joint with the driving and driven shafts in alinement, the section being on the line 1—1 of Fig. 2.
Figure 2:
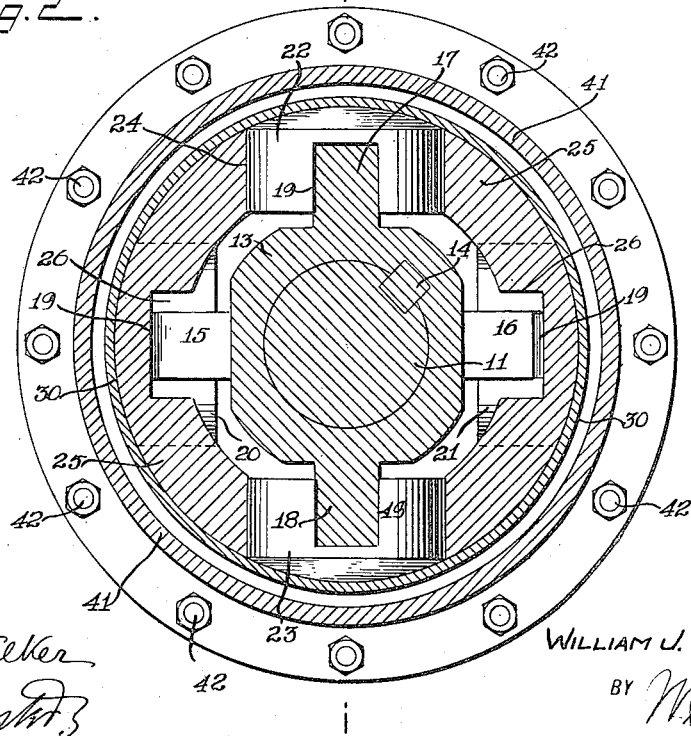
Fig. 2 is a cross section of the same on the line 2—2 of Fig. 1.

Of the two shafts 10 and 11 shown in the drawings either may be the motor or driving shaft and the other the driven shaft. On the adjacent ends of the shafts 10 and 11 are fastened hubs or flanges 12 and 13 by the use of keys 14 or other suitable fastening means. The hub 12 is provided with two diametrically disposed driving members 15 and 16, and similar driving members 17 and 18 are diametrically disposed on the hub 13 and the driving members 15 and 16 are arranged at a right angle to the driving members 17 and 18, as will be readily understood by reference to Fig. 2. The driving members 15, 16, 17 and 18 are preferably in the form of longitudinally extending ribs and fit into slots 19 formed in the inner faces of connecting members 20, 21, 22 and 23 in the form of disks or pivots mounted to turn in bearings 24 formed in the sleeve 25.

It will be noticed that by the arrangement described the rotary motion of the driving shaft (say the shaft 10) is transmitted by the driving members 15, 16 to the connecting members 20, 21 in turn to rotate the sleeve 25, and the latter, by the connecting members 22 and 23 engaging the driving members 17 and 18 of the hub 13, rotate the latter and consequently the shaft 11 to be driven. It will be noticed that the driving members 15, 16 and 17, 18 have a rocking connection with their connecting members 20, 21, 22 and 23 and hence the shafts 10 and 11 assume an angular position one relative to the other to insure the transmission of uniform motion owing to the connecting members 20, 21, 22 and 23 being mounted in the sleeve 25 on both sets of driving members. The slots 19 in the connecting members 20, 21, 22 and 23 register with similar slots 26 formed in the inner face of the sleeve 25 to allow the corresponding inner ends of the driving members 15, 16, 17 and 18 to pass into the said slots 26 on the shafts 10 and 11 assuming an angular position one relative to the other, as plainly shown in Fig. 3.

The outer edges of the driving members 15, 16, 17 and 18 are preferably beveled in opposite directions to provide for a rocking connection between the driving members and the connecting members. The outer faces of the driving members 20, 21, 22 and 23 are preferably spherical and are engaged by a retaining ring 30 fitting exteriorly onto the sleeve 25. Thus by the arrangement described the driving members 20, 21, 22 and 23 are held in the sleeve 25 and at the same time the driving members are free to rock relative to the retaining ring 30.

The hubs 12 and 13 are provided at their opposite faces with centrally arranged sockets 35 and 36, in which is seated a ball 37 the center of which coincides with the center of the universal joint. It will be noticed that this open ball and socket joint permits the shafts 10 and 11 to assume an angular position one relative to the other and at the same time the ball and socket joint forms a thrust bearing for the ends of the shafts.

The uniform motion universal joint is provided with a suitable housing made in two parts 40 and 41 fastened together with bolts 42 and having spherical ends 43, 44 interiorly engaged by spherical flanges 45 and 46 held on the corresponding shafts 10, 11. It will be noticed that by the arrangement described, dust and other extraneous matter is prevented from reaching the working part of the uniform motion universal joint.

By reference to Fig. 6, it will be noticed that while the driving point 50 of the hub 12 travels in the direction of the arrow to the point 51, that is, its 45° position, the angular advance of the driven point on the sleeve 25 is less by the value $x$ due to its traveling toward the apex of the minor axis of the ellipse described by the sleeves 25 with relation to the circle described by the hub 12. At the same time the driving point 60 on the sleeve 25 travels in the direction of the arrow to the point 61, that is, its 45° position, with the angular advance of the universal joint on the hub 13 greater by the value $y$ due to its traveling toward the apex of the major axis of the ellipse described by the hub 12 with relation to the circle described by the sleeve 25. $x$ and $y$ are opposite and hence the angular advance of the hubs 12 and 13 is uniform.

Having thus described my invention, I claim as new and desire to secure by Letters Patent:—

1. A uniform motion universal joint, comprising driving members secured on the adjacent ends of a driving and a driven shaft, a sleeve, and connecting members mounted to turn in the sleeve and having a rocking connection with the said driving members.

2. A uniform motion universal joint, comprising driving members secured on the ends of a driving and a driven shaft and extending radially thereto, a sleeve encompassing both driving members, and connecting members for the driving members of each shaft, said connecting members being mounted to turn in the said sleeve and having their axes intersecting the axes of the shafts, the said driving members having a rocking connection with the said connecting members.

3. A uniform motion universal joint, comprising driving members secured on the ends of a driving and a driven shaft and extending radially thereto, the driving members on one shaft being disposed at right angles to the driving members on the other shaft, a sleeve encompassing both driving members, and connecting members for the driving members of each shaft, said connecting members being mounted to turn in the said sleeve and having their axes intersecting the axes of the shafts, the said driving members having a rocking connection with the said connecting members.

4. A uniform motion universal joint, comprising driving and driven shafts, hubs on the adjacent ends of the shafts and having a jointed connection with each other, said hubs being provided with radial driving members in the form of longitudinally extending ribs, disks engaged by the said driving members, and a sleeve in which the said disks are mounted to turn.

5. A uniform motion universal joint, comprising driving members in the form of longitudinally extending ribs secured on the adjacent ends of a driving and a driven shaft, a sleeve, connecting members mounted to turn in the sleeve and having a rocking connection with the said driving members, and a ball and socket connection between the ends of the said driving and driven shafts.

6. A uniform motion universal joint, comprising a driving shaft, a driven shaft, hubs secured on the adjacent ends of the said shafts and each provided with diametrically disposed driving members, the driving members on one hub being at a right angle to the driving members on the other hub, a sleeve, and disks mounted to turn in the said sleeve and having their axes intersecting the axes of the corresponding shafts, the disks being provided at their inner faces with slits engaged by the said driving members of the hubs.

7. A uniform motion universal joint, comprising a driving shaft, a driven shaft, hubs secured on the adjacent ends of the said shafts, and each provided with diametrically disposed driving members, the driving members on one hub being at a right angle to the driving members on the other hub, a sleeve, disks mounted to turn in the said sleeve and having their axes intersecting the axes of the corresponding shafts, the disks being provided at their inner faces with slots engaged by the said driving members of the hubs, and retaining means on the said sleeve and extending over the said disks to hold the latter in place on the sleeve.

8. A uniform motion universal joint, comprising a driving shaft, a driven shaft, hubs secured on the adjacent ends of the said shafts and each provided with diametrically disposed driving members, the driving members on one hub being at a right angle to the driving members on the other hub, a sleeve, disks mounted to turn in the said sleeve and having their axes intersecting the axes of the corresponding shafts, the disks being provided at their inner faces with slots engaged by the said driving members of the hubs, the outer faces of the said disks being spherical, and a retaining ring fitting exteriorly on the said sleeve and engaging the spherical outer faces of the said disks to hold the latter in place on the sleeve.

WILLIAM J. FRANCKE.